UNITED STATES PATENT OFFICE.

JOHN C. WICHMANN, OF LOS ANGELES, CALIFORNIA, ASSIGNOR OF ONE-HALF TO LOUIS J. MAESCHER, OF LOS ANGELES, CALIFORNIA.

PROCESS OF MAKING RUBBER-LIKE MATERIAL.

1,379,150.     Specification of Letters Patent.     Patented May 24, 1921.

No Drawing.     Application filed December 22, 1920. Serial No. 432,601.

*To all whom it may concern:*

Be it known that I, JOHN C. WICHMANN, a citizen of the United States, residing at Los Angeles, in the county of Los Angeles and State of California, have invented new and useful Improvements in Processes of Making Rubber-Like Material, of which the following is a specification.

My invention relates to a process of making a rubber-like material and it is an object of this invention to treat certain plants in a manner to form a product which in its physical characteristics is similar to the Pará rubber of commerce.

My invention consists in the steps of the process hereinafter described and claimed.

I have discovered that the yucca plant contains a substance which, when mixed with re-agents and treated in a manner presently to be described yields a rubber-like product.

The yucca plant, inclusive of the roots, but discarding the leaves, is macerated by any suitable apparatus and placed in a closed vessel, and treated with live steam of forty to fifty pounds pressure for about half an hour. The live steam will release all the gummy and mucilaginous substances next to the skin of the plant where they are found in greatest abundance. The cooked pulp is now put into a suitable press and the juice is extracted therefrom. The extracted juice is placed into a steam jacketed evaporating pan and condensed to a consistency of thin molasses, which ordinarily will take place when about two-thirds of its original volume has evaporated.

A ton of yucca plants will yield about 165 pounds of concentrated juice. Assuming that 100 pounds of concentrated juice is to be treated one-half pound of sodium tungstate is now added and thoroughly incorporated in the juice until dissolved. In the meantime a mixture of the following re-agents is prepared in a separate double jacketed steam boiler:

52 pounds high grade asphaltum,
20 pounds flour of sulfur,
4 pounds of boiled linseed oil,
6 pounds of Pará gum dissolved in turpentine,
2 pounds magnesium oxid,
4 pounds antimony sulfid.

These ingredients are thoroughly mixed and molten at a temperature of 256° F. and are then added to the concentrated yucca juice mixed with one-half pound of sodium tungstate, above referred to. The two mixtures are thoroughly combined by agitation while the same are cooked for one hour and a half under a steam pressure of 18 to 20 pounds. (256° to 260° F.) As soon as the mixture is homogeneous and all the ingredients are thoroughly dissolved the composition is poured into flat bottom steam jacketed evaporating pans. The temperature is preferably kept from 150° to 180° F. until the composition has solidified.

The sodium tungstate serves to vulcanize the yucca juice and to give tensile strength to the finished rubber composition. It is, however, not essential and may be omitted provided Pará gum is substituted therefor. The asphaltum gives body to the finished product and is essential as well as the sulfur. The linseed oil acts as a binder for the composition. The Pará gum appears to act as a catalyzer and a binder and serves to toughen the final product. The magnesium oxid and the antimony sulfid act as binders and assist in the solidifying of the mixture. However, either the magnesium oxid or the antimony sulfid, or both may be omitted, provided a correspondingly larger quantity of Pará gum is used.

In place of the yucca plant the ocotilla plant may be used or a mixture of the two. The final product may be treated like any other crude rubber in the manufacture of rubber articles. The ocotilla plant is, for the purpose of making my rubber-like material, an equivalent of the yucca plant, and it will be understood that the term "yucca plant" in the claims includes the ocotilla plant as well, or a mixture of the two.

Various changes may be made in the steps of the process by those skilled in the art without departing from the spirit of my invention as claimed.

I claim:

1. A process of making a rubber-like substance, comprising macerating the fleshy parts of the yucca plant, heating the same above the boiling point of water, extracting the juice therefrom, adding a catalyzer consisting of a mixture of sodium tungstate, concentrating the juice, adding a solution of Pará rubber, linseed oil, and a molten solution of asphaltum and sulfur to the concentrated juice, boiling the same under agitation, and drying and oxidizing the resulting mass.

2. A process of making a rubber-like substance, comprising macerating the fleshy parts of the yucca plant, heating the same above the boiling point of water, extracting the juice therefrom, adding a catalyzer consisting of one-half pound of sodium tungstate, fifty-two pounds asphaltum, twenty pounds sulfur, four pounds boiled linseed oil, six pounds Pará gum, two pounds magnesium oxid, four pounds antimony sulfid to the concentrated juice, and drying and oxidizing the resulting mass, the quantities of the reagents enumerated being based on one hundred pounds of concentrated juice of the consistency of thin molasses.

3. A process of making a rubber-like substance, comprising macerating the fleshy parts of the yucca plant, heating the same, extracting the juice therefrom, adding a solution of Pará rubber, linseed oil, and a mixture of asphaltum and sulfur, boiling the juices and drying and oxidizing the resulting mass.

In testimony whereof I have signed my name to this specification.

JOHN C. WICHMANN.